(12) United States Patent
Hiasa (10) Patent No.: US 12,237,473 B2
(45) Date of Patent: Feb. 25, 2025

(54) SECONDARY BATTERY (71) Applicant: MURATA MANUFACTURING CO., LTD., Kyoto (JP)

(72) Inventor: Takumi Hiasa, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 70 days.

(21) Appl. No.: 17/508,031

(22) Filed: Oct. 22, 2021

(65) Prior Publication Data

US 2022/0045369 A1 Feb. 10, 2022

Related U.S. Application Data (63) Continuation of application No. PCT/JP2020/017576, filed on Apr. 23, 2020.

(30) Foreign Application Priority Data

Apr. 24, 2019 (JP) .................. 2019-082918

(51) Int. Cl.
*H01M 10/38* (2006.01)
(52) U.S. Cl.
CPC .... *H01M 10/38* (2013.01); *H01M 2300/0005* (2013.01); *H01M 2300/0014* (2013.01)
(58) Field of Classification Search
CPC ......... H01M 10/38; H01M 2300/0005; H01M 2300/0014
See application file for complete search history.

(56) References Cited

U.S. PATENT DOCUMENTS

| 2015/0017558 A1* | 1/2015 | Kim | H01M 8/04276 |
| | | | 429/418 |
| 2016/0211539 A1* | 7/2016 | Goeltz | H01M 8/188 |
| 2018/0269537 A1 | 9/2018 | Yoshima et al. | |
| 2018/0277899 A1 | 9/2018 | Takami et al. | |
| 2019/0089007 A1 | 3/2019 | Suyama et al. | |

(Continued)

FOREIGN PATENT DOCUMENTS

| CN | 108631006 | | 10/2018 |
| CN | 109524726 | | 3/2019 |
| EP | 3460899 | * | 3/2019 |

(Continued)

OTHER PUBLICATIONS

WO 2016114141 MT (Year: 2016).*

(Continued)

*Primary Examiner* — Alexander Usyatinsky
(74) *Attorney, Agent, or Firm* — K&L Gates LLP (57) ABSTRACT

A secondary battery includes a partition, a negative electrode, a positive electrode, a first aqueous electrolytic solution, and a second aqueous electrolytic solution. The partition separates a first space and a second space from each other and allows a metal ion to pass therethrough between the first space and the second space. The negative electrode is disposed in the first space. The positive electrode is disposed in the second space. The first aqueous electrolytic solution is contained in the first space. The second aqueous electrolytic solution is contained in the second space. The second aqueous electrolytic solution has a pH lower than the first aqueous electrolytic solution.

14 Claims, 1 Drawing Sheet

(56) References Cited

U.S. PATENT DOCUMENTS

2019/0089011 A1   3/2019  Seki et al.
2019/0121537 A1   4/2019  Wu et al.

FOREIGN PATENT DOCUMENTS

| EP | 18159129.8 | | 3/2019 | | |
|----|------------|---|--------|---|---|
| EP | 18160434.9 | | 3/2019 | | |
| JP | H04101358 | A | 4/1992 | | |
| JP | 2005251586 | A | 9/2005 | | |
| JP | 2017123222 | A | 7/2017 | | |
| JP | 2018156837 | A | 10/2018 | | |
| JP | 2018160342 | A | 10/2018 | | |
| JP | 2019053931 | A | 4/2019 | | |
| JP | 2019057373 | A | 4/2019 | | |
| JP | 2019121537 | A | 7/2019 | | |
| WO | WO 2016114141 | | * 7/2016 | | |
| WO | WO-2018201239 A1 | | * 11/2018 | ............. | H01G 11/28 |

OTHER PUBLICATIONS

Chemist's Companion, John Wiley & Sons, 1972, p. 72-79 (Year: 1979).*
The decision of JPO to grant a Patent for Application JP 2021516224 (Year: 2023).*
International Search Report for Application No. PCT/JP2020/017576, dated Jul. 28, 2020.
European Search Report issued Jan. 3, 2023 in corresponding European Application No. 20795808.3.

* cited by examiner

SECONDARY BATTERY

CROSS REFERENCE TO RELATED APPLICATIONS

The present application is a continuation of PCT patent application no. PCT/JP2020/017576, filed on Apr. 23, 2020, which claims priority to Japanese patent application no. JP2019-082918 filed on Apr. 24, 2019, the entire contents of which are being incorporated herein by reference.

BACKGROUND

The present technology generally relates to a secondary battery including a positive electrode, a negative electrode, and an aqueous electrolytic solution.

Various electronic apparatuses such as mobile phones have been widely used. Such widespread use has promoted development of a secondary battery as a power source that is smaller in size and lighter in weight and allows for a higher energy density. As such a secondary battery, a secondary battery including an aqueous electrolytic solution is being developed.

A configuration of the secondary battery including the aqueous electrolytic solution influences a battery characteristic. Accordingly, various considerations have been given to the configuration of such a secondary battery. Specifically, in order to achieve superior charge and discharge efficiency, in a secondary battery of a lithium insertion and extraction type, a first aqueous electrolytic solution is provided on the positive electrode side and a second aqueous electrolytic solution is provided on the negative electrode side, with a lithium-ion concentration of the second aqueous electrolytic solution set to be higher than a lithium-ion concentration of the first aqueous electrolytic solution. In order to achieve both a high voltage and a high output, in a secondary battery of a flow type, a pH of a negative electrode electrolytic solution is set to be higher than a pH of a positive electrode electrolytic solution. In order to obtain a superior charge and discharge cyclability characteristic, in a secondary battery of the lithium insertion and extraction type, an aqueous electrolytic solution having a pH of 6 to 10 both inclusive is used.

In order to achieve a high-performance secondary battery, an acidic electrolytic solution is used as an electrolytic solution for the positive electrode, and an alkaline electrolytic solution is used as an electrolytic solution for the negative electrode. In order to secure cycle stability, titanium oxide with a carbon coating layer is used as a negative electrode active material and a charge potential of the negative electrode active material is set to be more noble than a reductive decomposition potential of carbon and more base than a reductive decomposition potential of a negative electrode current collector. In order to suppress electrolysis of the aqueous electrolytic solution on a surface of the negative electrode upon charging and discharging, an aqueous electrolytic solution including a lithium ion, an imide-based anion such as a TFSI anion, and a metal cation such as an aluminum ion is used, and the aqueous electrolytic solution has a pH of 3 to 12 both inclusive.

SUMMARY

The present technology generally relates to a secondary battery including a positive electrode, a negative electrode, and an aqueous electrolytic solution.

Electronic apparatuses, on which a secondary battery is to be mounted, are increasingly gaining higher performance and more functions. This is causing more frequent use of such electronic apparatuses and expanding a use environment of the electronic apparatuses. Accordingly, there is still room for improvement in terms of a battery characteristic of the secondary battery.

The present technology has been made in view of such an issue and it is an object of the technology to provide a secondary battery that is able to achieve a superior battery characteristic.

A secondary battery according to an embodiment of the present technology includes a partition, a negative electrode, a positive electrode, a first aqueous electrolytic solution, and a second aqueous electrolytic solution. The partition separates a first space and a second space from each other and allows a metal ion to pass therethrough between the first space and the second space. The negative electrode is disposed in the first space and is an electrode which the metal ion is to be inserted into and extracted from. The positive electrode is disposed in the second space and is an electrode which the metal ion is to be inserted into and extracted from. The first aqueous electrolytic solution is contained in the first space and includes the metal ion to be inserted into and extracted from each of the negative electrode and the positive electrode. The second aqueous electrolytic solution is contained in the second space and includes the metal ion to be inserted into and extracted from each of the negative electrode and the positive electrode. The second aqueous electrolytic solution has a pH lower than the first aqueous electrolytic solution.

According to the secondary battery of an embodiment of the present technology, the negative electrode which the metal ion is to be inserted into and extracted from is disposed in the first space, and the first aqueous electrolytic solution is contained in the first space. The positive electrode which the metal ion is to be inserted into and extracted from is disposed in the second space, and the second aqueous electrolytic solution is contained in the second space. The first aqueous electrolytic solution and the second aqueous electrolytic solution each include the metal ion to be inserted into and extracted from each of the negative electrode and the positive electrode. The second aqueous electrolytic solution has a pH that is lower than the pH of the first aqueous electrolytic solution. This makes it possible to achieve a superior battery characteristic.

It should be understood that effects of the present technology are not necessarily limited to that described above and may include any of a series of effects described below in relation to the present technology.

DETAILED DESCRIPTION

As described herein, the present disclosure will be described based on examples with reference to the drawings, but the present disclosure is not to be considered limited to the examples, and various numerical values and materials in the examples are considered by way of example.

A description is given first of a secondary battery according to an embodiment of the technology.

A secondary battery to be described here is a secondary battery utilizing insertion and extraction of a metal ion. The secondary battery includes a positive electrode, a negative electrode, and an electrolytic solution that is a liquid electrolyte including an aqueous solvent, i.e., an aqueous electrolytic solution. The secondary battery utilizes insertion and extraction of the metal ion to allow charging and discharging reactions to proceed, thereby obtaining a battery capacity.

The metal ion to be inserted and extracted in the secondary battery is not limited to a particular kind. The metal ion includes, for example, a light metal ion such as an alkali metal ion or an alkaline earth metal ion. Among these light metal ions, the metal ion preferably includes the alkali metal ion. A reason for this is that the charging and discharging reactions proceed stably while a high voltage is obtained. Examples of the alkali metal ion include a lithium ion, a sodium ion, and a potassium ion.

Figure 1:
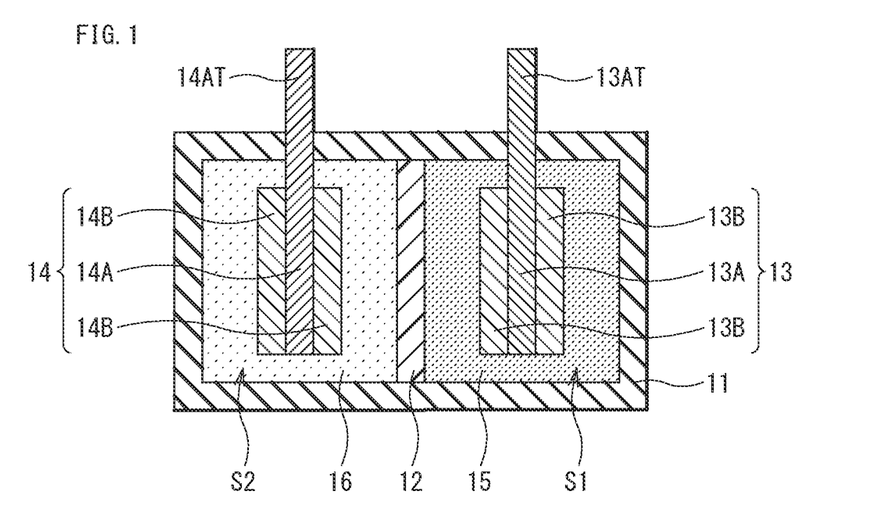
FIG. 1 is a sectional view of a configuration of a secondary battery according to an embodiment of the present technology.

FIG. 1 illustrates a sectional configuration of the secondary battery. As illustrated in FIG. 1, for example, the secondary battery includes a partition 12, a negative electrode 13, a positive electrode 14, a negative electrode electrolytic solution 15, and a positive electrode electrolytic solution 16 in an outer package member 11. The negative electrode electrolytic solution 15 serves as a first aqueous electrolytic solution, and the positive electrode electrolytic solution 16 serves as a second aqueous electrolytic solution. The negative electrode electrolytic solution 15 and the positive electrode electrolytic solution 16 are each the aqueous electrolytic solution described above. That is, the negative electrode electrolytic solution 15 and the positive electrode electrolytic solution 16 are each an electrolytic solution using an aqueous solvent. More specifically, the negative electrode electrolytic solution 15 and the positive electrode electrolytic solution 16 are each a solution in which an ionic material ionizable in the aqueous solvent is dissolved or dispersed in the aqueous solvent. It should be understood that, in FIG. 1, the negative electrode electrolytic solution 15 is darkly shaded and the positive electrode electrolytic solution 16 is lightly shaded.

In the following, a description is given of an example case where the metal ion to be inserted into and extracted from each of the negative electrode 13 and the positive electrode 14 includes the alkali metal ion. That is, the secondary battery described below utilizes insertion and extraction of the alkali metal ion to obtain a battery capacity.

The outer package member 11 has an internal space for containing components including, without limitation, the partition 12, the negative electrode 13, the positive electrode 14, the negative electrode electrolytic solution 15, and the positive electrode electrolytic solution 16. The outer package member 11 includes one or more of materials including, without limitation, a metal material, a glass material, and a polymer compound. Specifically, the outer package member 11 may be, for example but not limited to, a rigid metal can, a rigid glass case, a rigid plastic case, a soft or flexible metal foil, or a soft or flexible polymer film.

The partition 12 is disposed between the negative electrode 13 and the positive electrode 14, and divides the internal space of the outer package member 11 into two spaces, i.e., a negative electrode compartment S1 serving as a first space and a positive electrode compartment S2 serving as a second space. The partition 12 thus separates the negative electrode compartment S1 and the positive electrode compartment S2 from each other in the outer package member 11. Accordingly, the negative electrode 13 and the positive electrode 14 are separated from each other with the partition 12 therebetween.

The partition 12 includes, for example, a material that does not allow an anion to pass therethrough and allows a substance such as the alkali metal ion (a cation) other than the anion, which is to be inserted into and extracted from each of the negative electrode 13 and the positive electrode 14, to pass therethrough, between the negative electrode compartment S1 and the positive electrode compartment S2. A reason for this is that this prevents mixing of the negative electrode electrolytic solution 15 and the positive electrode electrolytic solution 16 with each other. That is, the partition 12 allows a substance such as the cation to pass therethrough from the negative electrode compartment S1 to the positive electrode compartment S2, and allows the substance such as the cation to pass therethrough from the positive electrode compartment S2 to the negative electrode compartment S1.

Specifically, the partition 12 includes one or more of membranes including, without limitation, an ion exchange membrane and a solid electrolyte membrane. The ion exchange membrane is a porous membrane that allows a cation to pass therethrough, i.e., a positive ion exchange membrane. The solid electrolyte membrane is conductive of the alkali metal ion. A reason for using such one or more membranes in the partition 12 is that a property of the partition 12 allowing the cation to pass therethrough is thereby improved.

In particular, it is more preferable for the partition 12 to include the ion exchange membrane than the solid electrolyte membrane. A reason for this is that this makes it easier for each of the aqueous solvent in the negative electrode electrolytic solution 15 and the aqueous solvent in the positive electrode electrolytic solution 16 to penetrate into the partition 12, which improves ion conductivity inside the partition 12.

The negative electrode 13 is disposed in the negative electrode compartment S1, and allows the alkali metal ion to be inserted thereinto and extracted therefrom. The negative electrode 13 includes, for example, a negative electrode current collector 13A, and a negative electrode active material layer 13B provided on each of both sides of the negative electrode current collector 13A. However, the negative electrode active material layer 13B may be provided, for example, only on one side of the negative electrode current collector 13A. It should be understood that the negative electrode current collector 13A is omittable. Therefore, the negative electrode 13 may include, for example, only the negative electrode active material layer 13B.

The negative electrode current collector 13A includes one or more of electrically conductive materials including, without limitation, a metal material, a carbon material, and an electrically conductive ceramic material. Examples of the metal material include stainless steel (SUS), titanium, zinc, tin, lead, and an alloy thereof. The stainless steel may be, for example, highly corrosion-resistant stainless steel to which one or more of additive elements including, without limitation, niobium and molybdenum are added. Specific examples of the stainless steel include SUS444 including added molybdenum. Examples of the electrically conductive ceramic material include indium tin oxide (ITO). It should be understood that a portion of the negative electrode current collector 13A, i.e., a coupling terminal 13AT, is led out, for example, from inside to outside of the outer package member 11.

In particular, the negative electrode current collector 13A preferably includes a material that is insoluble or sparingly soluble in and resistant to corrosion by the negative electrode electrolytic solution 15, and that has low reactivity to the later-described negative electrode active material. Therefore, the negative electrode current collector 13A preferably includes any of the above-described metal materials. That is, the negative electrode current collector 13A preferably includes a material such as stainless steel (SUS), titanium, zinc, tin, lead, or an alloy thereof. A reason for this is that degradation of the negative electrode current collector 13A is thereby suppressed even when the secondary battery is used.

The negative electrode current collector 13A may be, for example, an electric conductor having a surface covered with plating of one or more materials among the metal material, the carbon material, and the electrically conductive ceramic material described above. The electric conductor is not limited to a particular material as long as the material is electrically conductive.

The negative electrode active material layer 13B includes one or more of negative electrode materials which the alkali metal ion is insertable into and extractable from, as a negative electrode active material or negative electrode active materials. Examples of the negative electrode material include a titanium-containing compound, a niobium-containing compound, a vanadium-containing compound, an iron-containing compound, and a molybdenum-containing compound. A reason for using such one or more negative electrode materials in the negative electrode active material layer 13B is that this allows the charging and discharging reactions to proceed smoothly and stably even in a case of using the aqueous electrolytic solution, i.e., the negative electrode electrolytic solution 15 and the positive electrode electrolytic solution 16. It should be understood that the negative electrode active material layer 13B may further include another material such as a negative electrode binder or a negative electrode conductor.

Examples of the titanium-containing compound include a titanium oxide, an alkali-metal-titanium composite oxide, a titanium phosphoric acid compound, an alkali metal titanium phosphoric acid compound, and a hydrogen titanium compound.

Examples of the titanium oxide include a compound represented by Formula (1) below, i.e., a bronze-type titanium oxide and the like.

$$TiO_w \quad (1)$$

where w satisfies $1.85 \leq w \leq 2.15$.

Examples of the titanium oxide above include titanium oxides ($TiO_2$) of an anatase type, a rutile type, and a brookite type. However, the titanium oxide may be a composite oxide including one or more of elements including, without limitation, phosphorus, vanadium, tin, copper, nickel, iron, and cobalt together with titanium as a constituent element or constituent elements. Examples of such a composite oxide include $TiO_2$—$P_2O_5$, $TiO_2$—$V_2O_5$, $TiO_2$—$P_2O_5$—$SnO_2$, and $TiO_2$—$P_2O_5$-MeO where Me is one or more of elements including, without limitation, copper, nickel, iron, and cobalt.

One kind of the alkali-metal-titanium composite oxide is a lithium-titanium composite oxide, examples of which include respective compounds represented by Formulas (2) to (4) below, i.e., a ramsdellite-type lithium titanate and the like. M2 in Formula (2) is a metal element that is to be a divalent ion. M3 in Formula (3) is a metal element that is to be a trivalent ion. M4 in Formula (4) is a metal element that is to be a tetravalent ion.

$$Li[Li_xM2_{(1-3x)/2}Ti_{(3+x)/2}]O_4 \quad (2)$$

where:
M2 is at least one of magnesium (Mg), calcium (Ca), copper (Cu), zinc (Zn), or strontium (Sr); and
x satisfies $0 \leq x \leq \frac{1}{3}$.

$$Li[Li_yM3_{1-3y}Ti_{1+2y}]O_4 \quad (3)$$

where:
M3 is at least one of aluminum (Al), scandium (Sc), chromium (Cr), manganese (Mn), iron (Fe), germanium (Ge), or yttrium (Y); and
y satisfies $0 \leq y \leq \frac{1}{3}$.

$$Li[Li_{1/3}M4_zTi_{(5/3)-z}]O_4 \quad (4)$$

where:
M4 is at least one of vanadium (V), zirconium (Zr), or niobium (Nb); and
z satisfies $0 \leq z \leq \frac{2}{3}$.

Specifically, examples of the lithium-titanium composite oxide represented by Formula (2) include $Li_{3.75}Ti_{4.875}Mg_{0.375}O_{12}$. Examples of the lithium-titanium composite oxide represented by Formula (3) include $LiCrTiO_4$. Examples of the lithium-titanium composite oxide represented by Formula (4) include $Li_4Ti_5O_{12}$ and $Li_4Ti_{4.95}Nb_{0.05}O_{12}$.

Another kind of the alkali-metal-titanium composite oxide is a potassium-titanium composite oxide, examples of which include $K_2Ti_3O_7$ and $K_4Ti_5O_{12}$.

Examples of the titanium phosphoric acid compound include titanium phosphate ($TiP_2O_7$). One kind of the alkali metal titanium phosphoric acid compound is a lithium titanium phosphoric acid compound, examples of which include $LiTi_2(PO_4)_3$. Another kind of the alkali metal titanium phosphoric acid compound is a sodium titanium phosphoric acid compound, examples of which include $NaTi_2(PO_4)_3$. Examples of the hydrogen titanium compound include $H_2Ti_3O_7(3TiO_2\cdot 1H_2O)$, $H_6Ti_{12}O_{27}$ $(3TiO_2\cdot 0.75H_2O)$, $H_2Ti_6O_{13}(3TiO_2\cdot 0.5H_2O)$, $H_2Ti_7O_{15}$ $(3TiO_2\cdot 0.43H_2O)$, and $H_2Ti_{12}O_{25}(3TiO_2\cdot 0.25H_2O)$.

Examples of the niobium-containing compound include an alkali-metal-niobium composite oxide, a hydrogen niobium compound, and a titanium-niobium composite oxide. It should be understood that a material belonging to the niobium-containing compound is excluded from the titanium-containing compound.

Examples of the alkali-metal-niobium composite oxide include $LiNbO_2$. Examples of the hydrogen niobium compound include $H_4Nb_6O_{17}$. Examples of the titanium-niobium composite oxide include $TiNb_2O_7$ and $Ti_2Nb_{10}O_{29}$. The titanium-niobium composite oxide may be intercalated with alkali metal, for example.

Examples of the vanadium-containing compound include a vanadium oxide and an alkali-metal-vanadium composite oxide. It should be understood that a material belonging to the vanadium-containing compound is excluded from each of the titanium-containing compound and the niobium-containing compound.

Examples of the vanadium oxide include vanadium dioxide ($VO_2$). Examples of the alkali-metal-vanadium composite oxide include $LiV_2O_4$ and $LiV_3O_8$.

Examples of the iron-containing compound include iron hydroxide. It should be understood that a material belonging to the iron-containing compound is excluded from each of the titanium-containing compound, the niobium-containing compound, and the vanadium-containing compound.

Examples of the iron hydroxide include iron oxyhydroxide (FeOOH). The iron oxyhydroxide may be, for example, α-iron oxyhydroxide, β-iron oxyhydroxide, γ-iron oxyhydroxide, δ-iron oxyhydroxide, or any two or more thereof.

Examples of the molybdenum-containing compound include a molybdenum oxide and a cobalt-molybdenum composite oxide. It should be understood that a material belonging to the molybdenum-containing compound is excluded from each of the titanium-containing compound, the niobium-containing compound, the vanadium-containing compound, and the iron-containing compound.

Examples of the molybdenum oxide include molybdenum dioxide ($MoO_2$). Examples of the cobalt-molybdenum composite oxide include $CoMoO_4$.

The negative electrode binder includes one or more of materials including, without limitation, a synthetic rubber and a polymer compound. Examples of the synthetic rubber include a styrene-butadiene-based rubber. Examples of the polymer compound include polyvinylidene difluoride and polyimide.

The negative electrode conductor includes one or more of electrically conductive materials including, without limitation, a carbon material. Examples of the carbon material include graphite, carbon black, acetylene black, and Ketjen black. It should be understood that the electrically conductive material may be a material such as a metal material, an electrically conductive ceramic material, or an electrically conductive polymer.

The positive electrode 14 is disposed in the positive electrode compartment S2, and allows the alkali metal ion to be inserted thereinto and extracted therefrom. The positive electrode 14 includes, for example, a positive electrode current collector 14A, and a positive electrode active material layer 14B provided on each of both sides of the positive electrode current collector 14A. However, the positive electrode active material layer 14B may be provided, for example, only on one side of the positive electrode current collector 14A. It should be understood that the positive electrode current collector 14A is omittable. Therefore, the positive electrode 14 may include, for example, only the positive electrode active material layer 14B.

The positive electrode current collector 14A includes one or more of electrically conductive materials including, without limitation, a metal material, a carbon material, and an electrically conductive ceramic material. Examples of the metal material include titanium, aluminum, and an alloy thereof. Details of the electrically conductive ceramic material are as described above, for example. It should be understood that a portion of the positive electrode current collector 14A, i.e., a coupling terminal 14AT, is led out, for example, from inside to outside of the outer package member 11. A direction in which the coupling terminal 14AT is led out is, for example, similar to a direction in which the coupling terminal 13AT is led out.

In particular, the positive electrode current collector 14A preferably includes a material that is insoluble or sparingly soluble in and resistant to corrosion by the positive electrode electrolytic solution 16, and that has low reactivity to the later-described positive electrode active material. Therefore, the positive electrode current collector 14A preferably includes any of the above-described metal materials. That is, the positive electrode current collector 14A preferably includes a material such as titanium, aluminum, or an alloy thereof. A reason for this is that degradation of the positive electrode current collector 14A is thereby suppressed even when the secondary battery is used.

The positive electrode current collector 14A may be, for example, a electric conductor having a surface covered with plating of one or more materials among the metal material, the carbon material, and the electrically conductive ceramic material described above. The electric conductor is not limited to a particular material as long as the material is electrically conductive.

The positive electrode active material layer 14B includes one or more of positive electrode materials which the alkali metal ion is insertable into and extractable from, as a positive electrode active material or positive electrode active materials. It should be understood that the positive electrode active material layer 14B may further include another material such as a positive electrode binder or a positive electrode conductor.

The positive electrode material which a lithium ion is insertable into and extractable from as the alkali metal ion includes, for example, a lithium-containing compound. The lithium-containing compound is not limited to a particular kind, and examples thereof include a lithium composite oxide and a lithium phosphoric acid compound. The lithium composite oxide is an oxide that includes lithium and one or more transition metal elements. The lithium phosphoric acid compound is a phosphoric acid compound that includes lithium and one or more transition metal elements. The transition metal elements are not limited to particular kinds, and examples thereof include nickel (Ni), cobalt (Co), manganese (Mn), and iron (Fe).

Specifically, examples of a lithium composite oxide of a layered rock-salt type include $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, and $Li_{1.15}(Mn_{0.65}Ni_{0.22}Co_{0.13})O_2$. Examples of a lithium composite oxide of a spinel type include $LiMn_2O_4$. Examples of a lithium phosphoric acid compound of an olivine type include $LiFePO_4$, $LiMnPO_4$, $LiMn_{0.5}Fe_{0.5}PO_4$, $LiMn_{0.7}Fe_{0.3}PO_4$, and $LiMn_{0.75}Fe_{0.25}PO_4$.

The positive electrode material which a sodium ion is insertable into and extractable from as the alkali metal ion includes, for example, a sodium-containing compound. The sodium-containing compound is not limited to a particular kind, and examples thereof include a Prussian blue analog represented by Formula (5) below.

$$Na_xK_yM5_zFe(CN)_6 \cdot aH_2O \qquad (5)$$

where:
M5 is manganese (Mn), zinc (Zn), or both;
x, y, and z satisfy $0.5 < x \leq 2$, $0 \leq y \leq 0.5$, and $0 \leq z \leq 2$;
a is any value; and
y may satisfy $0.05 \leq y \leq 0.2$.

Specifically, examples of the Prussian blue analog represented by Formula (5) include $Na_2MnFe(CN_6)$, $Na_{1.42}K_{0.09}Mn_{1.13}Fe(CN)_6 \cdot 3H_2O$, and $Na_{0.83}K_{0.12}Zn_{1.49}Fe(CN)_6 \cdot 3.2H_2O$.

The positive electrode material which a potassium ion is insertable into and extractable from as the alkali metal ion includes, for example, a potassium-containing compound. The potassium-containing compound is not limited to a particular kind, and examples thereof include $K_{0.7}Fe_{0.6}Mn_{0.6}O_2$, $K_{0.6}MnO_2$, $K_{0.3}MnO_2$, $K_{0.31}CoO_2$, $KCrO_2$, $K_{0.6}CoO_2$, $K_{2/3}Mn_{2/3}Co_{1/3}Ni_{1/3}O_2$, $K_{2/3}Ni_{2/3}Te_{1/3}O_2$, $K_{2/3}Ni_{1/6}Co_{1/2}Te_{1/3}O_2$, $K_{2/3}Ni_{1/2}Mn_{1/6}Te_{1/3}O_2$, $K_{2/3}Ni_{1/2}Cu_{1/6}Te_{1/3}O_2$, $K_{2/3}Ni_{1/3}Zn_{1/3}Te_{1/3}O_2$, $K_{2/3}Ni_{1/6}Mg_{1/2}Te_{1/3}O_2$, $K_{2/3}Ni_{1/2}Co_{1/6}Te_{1/3}O_2$, $K_{2/3}Ni_{1/3}Mg_{1/3}Te_{1/3}O_2$, and $K_{2/3}Ni_{1/3}Co_{1/3}Te_{1/3}O_2$.

Details of the positive electrode binder are, for example, similar to those of the negative electrode binder. Details of the positive electrode conductor are, for example, similar to those of the negative electrode conductor.

The negative electrode electrolytic solution 15 is contained in the negative electrode compartment S1, and the positive electrode electrolytic solution 16 is contained in the positive electrode compartment S2. The negative electrode electrolytic solution 15 and the positive electrode electrolytic solution 16 are therefore separated from each other with the partition 12 therebetween in such a manner as not to be mixed with each other.

Specifically, the negative electrode electrolytic solution 15 and the positive electrode electrolytic solution 16 each include an aqueous solvent and one or more of ionic materials that are ionizable in the aqueous solvent. The negative electrode electrolytic solution 15 and the positive electrode electrolytic solution 16 each further include the alkali metal ion that is to be inserted into and extracted from each of the negative electrode 13 and the positive electrode 14.

Examples of the aqueous solvent include pure water. Examples of the ionic material include an acid, a base, and an electrolyte salt. The ionic material may include two or more of the above-described materials. Examples of the acid include oxalic acid ($H_2C_2O_4$), nitric acid ($HNO_3$), sulfuric acid ($H_2SO_4$), hydrochloric acid (HCl), acetic acid ($CH_3COOH$), and citric acid ($H_3C_6H_5O_7$).

The electrolyte salt is a salt including a cation and an anion. More specifically, the electrolyte salt includes one or more of metal salts. The metal salts are not limited to particular kinds, and examples thereof include an alkali metal salt, an alkaline earth metal salt, a transition metal salt, and other metal salts.

Examples of the alkali metal salt include a lithium salt, a sodium salt, and a potassium salt. The lithium salt is not limited to a particular kind, and examples thereof include lithium oxalate ($Li_2C_2O_4$), lithium nitrate ($LiNO_3$), lithium sulfate ($Li_2SO_4$), lithium chloride (LiCl), lithium acetate ($CH_3COOLi$), lithium citrate ($Li_3C_6H_5O_7$), lithium hydroxide (LiOH), and an imide salt. Examples of the imide salt include lithium bis(fluorosulfonyl)imide and lithium bis(trifluoromethane sulfonyl)imide. The sodium salt is not limited to a particular kind, and examples thereof include compounds obtained by replacing the lithium ions in the above-described lithium salts with sodium ions. The potassium salt is not limited to a particular kind, and examples thereof include compounds obtained by replacing the lithium ions in the above-described lithium salts with potassium ions.

The alkaline earth metal salt is not limited to a particular kind, and examples thereof include compounds obtained by replacing the lithium ions in the above-described lithium salts with cations of alkaline earth metal elements. More specifically, examples of the alkaline earth metal salt include a calcium salt. The transition metal salt is not limited to a particular kind, and examples thereof include compounds obtained by replacing the lithium ions in the above-described lithium salts with cations of transition metal elements. The other metal salt is not limited to a particular kind, and examples thereof include compounds obtained by replacing the lithium ions in the above-described lithium salts with cations of other metal elements.

The content of the ionic material, i.e., the concentration (mol/kg) of each of the negative electrode electrolytic solution 15 and the positive electrode electrolytic solution 16, may be freely set.

The composition formula, i.e., the kind of electrolyte salt, of the negative electrode electrolytic solution 15 may be the same as the composition formula, i.e., the kind of electrolyte salt, of the positive electrode electrolytic solution 16, or may be different from the composition formula of the positive electrode electrolytic solution 16. However, the positive electrode electrolytic solution 16 has a pH lower than the pH of the negative electrode electrolytic solution 15. A reason for this is that a decomposition potential of the aqueous solvent shifts due to the pH difference, as compared with a case where the pH of the positive electrode electrolytic solution 16 is the same as the pH of the negative electrode electrolytic solution 15. This widens the potential window of the aqueous solvent while thermodynamically suppressing a decomposition reaction of the aqueous solvent upon charging and discharging. Accordingly, the charging and discharging reactions utilizing insertion and extraction of the alkali metal ion proceed sufficiently and stably while a high voltage is obtained.

In particular, it is preferable that the composition formula, i.e., the kind of electrolyte salt, of the negative electrode electrolytic solution 15 be different from the composition formula, i.e., the kind of electrolyte salt, of the positive electrode electrolytic solution 16. A reason for this is that this makes it easier to control the pH of the positive electrode electrolytic solution 16 to be lower than the pH of the negative electrode electrolytic solution 15.

The value of the pH of each of the negative electrode electrolytic solution 15 and the positive electrode electrolytic solution 16 is not particularly limited as long as the pH of the positive electrode electrolytic solution 16 is lower than the pH of the negative electrode electrolytic solution 15.

In particular, the pH of the negative electrode electrolytic solution 15 is preferably 11 or higher, more preferably 12 or higher, and still more preferably 13 or higher. A reason for this is that this allows the negative electrode electrolytic solution 15 to have a sufficiently high pH, therefore making it easier for the pH of the positive electrode electrolytic solution 16 to be lower than the pH of the negative electrode electrolytic solution 15. Another reason is that this provides a sufficiently large difference between the pH of the positive electrode electrolytic solution 16 and the pH of the negative electrode electrolytic solution 15, therefore making it easier to maintain the high-and-low relationship between the pHs of the two electrolytic solutions.

The pH of the positive electrode electrolytic solution 16 is preferably from 3 to 8 both inclusive, more preferably from 4 to 8 both inclusive, and still more preferably from 4 to 6 both inclusive. A reason for this is that this provides a sufficiently large difference between the pH of the positive electrode electrolytic solution 16 and the pH of the negative electrode electrolytic solution 15, therefore making it easier to maintain the high-and-low relationship between the pHs of the two electrolytic solutions. Another reason is that this suppresses corrosion of the components including, without limitation, the outer package member 11, the negative electrode current collector 13A, and the positive electrode current collector 14A, therefore improving durability or stability of the components.

The electrolyte salt includes, for example, an alkali metal salt including, as a cation, the alkali metal ion to be inserted into and extracted from each of the negative electrode 13 and the positive electrode 14. In this case, the electrolyte salt may further include one or more of materials including optional electrolyte salts and a non-electrolyte. It should be understood that the above-described alkali metal salt including the alkali metal ion to be inserted into and extracted from each of the negative electrode 13 and the positive electrode 14 as a cation is excluded from the above-described optional electrolyte salts. The kinds of the optional electrolyte salts, i.e., the kinds of cations and the kinds of anions, are not particularly limited and may be freely selected.

Here, one or both of the negative electrode electrolytic solution 15 and the positive electrode electrolytic solution 16 include the alkali metal salt including the alkali metal ion to be inserted into and extracted from each of the negative electrode 13 and the positive electrode 14 as a cation, as described above. The alkali metal salt is not limited to a particular kind. Therefore, only one kind of alkali metal salt may be used, or two or more kinds of alkali metal salts may be used.

In this case, the one or both of the negative electrode electrolytic solution 15 and the positive electrode electrolytic solution 16 may further include one or more of other metal salts. The other metal salts each include, as a cation, another metal ion different from the alkali metal ion to be inserted into and extracted from each of the negative electrode 13 and the positive electrode 14. The other metal ion may be a metal ion to be inserted into and extracted from each of the negative electrode 13 and the positive electrode 14, may be a metal ion not to be inserted into and extracted from each of the negative electrode 13 and the positive electrode 14, or may be both.

The other metal ion that is the metal ion to be inserted into and extracted from each of the negative electrode 13 and the positive electrode 14 is not limited to a particular kind. Therefore, only one kind of such a metal ion may be used, or two or more kinds of such metal ions may be used. Examples of the other metal ion in this case include an alkali metal ion other than the alkali metal ion to be inserted into and extracted from each of the negative electrode 13 and the positive electrode 14.

The other metal ion that is the metal ion not to be inserted into and extracted from each of the negative electrode 13 and the positive electrode 14 is not limited to a particular kind. Therefore, only one kind of such a metal ion may be used, or two or more kinds of such metal ions may be used. Examples of the other metal ion in this case include one or more of freely-selected metal ions including, without limitation, an alkali metal ion other than the alkali metal ion to be inserted into and extracted from each of the negative electrode 13 and the positive electrode 14, an alkaline earth metal ion, a transition metal ion, and any other metal ion.

More specifically, one or both of the negative electrode electrolytic solution 15 and the positive electrode electrolytic solution 16 include a lithium salt including a lithium ion serving as a cation, as the alkali metal salt including the alkali metal ion to be inserted into and extracted from each of the negative electrode 13 and the positive electrode 14 serving as a cation.

In this case, the one or both of the negative electrode electrolytic solution 15 and the positive electrode electrolytic solution 16 preferably further include one or more of the above-described other metal salts each including the other metal ion serving as a cation. A reason for this is that the combination use of two or more metal salts, i.e., the alkali metal salt and the other metal salt, makes it easier to control each of the pH of the negative electrode electrolytic solution 15 and the pH of the positive electrode electrolytic solution 16, as compared with a case of using only one metal salt, i.e., only the alkali metal salt.

In particular, one or both of the negative electrode electrolytic solution 15 and the positive electrode electrolytic solution 16 preferably include a lithium salt (a lithium ion) which is the alkali metal salt, and one or both of a sodium salt (a sodium ion) and a potassium salt (a potassium ion) which are the other metal salts. A reason for this is that this makes it easier to control the pH of the positive electrode electrolytic solution 16 to be sufficiently lower than the pH of the negative electrode electrolytic solution 15, and therefore makes it easier to maintain the high-and-low relationship between the pHs of the two electrolytic solutions.

It should be understood that one or both of the negative electrode electrolytic solution 15 and the positive electrode electrolytic solution 16 are preferably a saturated solution of the alkali metal salt including the alkali metal ion to be inserted into and extracted from each of the negative electrode 13 and the positive electrode 14 as a cation. In particular, it is preferable that both of the negative electrode electrolytic solution 15 and the positive electrode electrolytic solution 16 be the above-described saturated solution of the alkali metal salt. A reason for this is that the charging and discharge reactions, i.e., the insertion and extraction reactions of the alkali metal ion, proceed stably upon charging and discharging.

In order to check whether the negative electrode electrolytic solution 15 is the saturated solution of the electrolyte salt, i.e., the alkali metal salt, for example, the secondary battery may be disassembled, and it may be checked whether the electrolyte salt is deposited in the inside of the negative electrode compartment S1. Examples of the inside of the negative electrode compartment S1 include a location in the negative electrode electrolytic solution 15, a location on the surface of the partition 12, a location on the surface of the negative electrode 13, and a location on the surface or the inner wall surface of the outer package member 11. If the electrolyte salt is deposited and therefore the negative electrode electrolytic solution 15, which is a liquid, and the deposited matter of the electrolyte salt, which is a solid, coexist in the inside of the negative electrode compartment S1, it can be considered that the negative electrode electrolytic solution 15 is a saturated solution of the electrolyte salt. In order to examine the composition of the deposited matter, for example, a surface analysis method such as X-ray photoelectron spectroscopy (XPS) can be used, or a composition analysis method such as inductively coupled plasma (ICP) emission spectroscopy can be used.

A method of checking whether the positive electrode electrolytic solution 16 is a saturated solution of the electrolyte salt, i.e., the alkali metal salt, is similar to the above-described method of checking whether the negative electrode electrolytic solution 15 is a saturated solution of the electrolyte salt, i.e., the alkali metal salt, except that the positive electrode compartment S2 is checked instead of the negative electrode compartment S1.

Further, the negative electrode electrolytic solution 15 and the positive electrode electrolytic solution 16 may each be a pH buffer solution. The pH buffer solution may be, for example, an aqueous solution in which a weak acid and a conjugate base thereof are mixed together, or an aqueous solution in which a weak base and a conjugate acid thereof are mixed together. A reason for this is that this sufficiently suppresses variation in pH, and therefore makes it easier to maintain each of the pH of the negative electrode electrolytic solution 15 and the pH of the positive electrode electrolytic solution 16 described above.

In particular, the positive electrode electrolytic solution 16 preferably includes one or more of a sulfuric acid ion, a hydrogen sulfuric acid ion, a carbonic acid ion, a hydrogen carbonic acid ion, a phosphoric acid ion, a monohydrogen phosphoric acid ion, a dihydrogen phosphoric acid ion, and a carboxylic acid ion as an anion or anions. A reason for this is that this sufficiently suppresses variation in pH of the positive electrode electrolytic solution 16, therefore making it easier to maintain each of the pH of the negative electrode electrolytic solution 15 and the pH of the positive electrode electrolytic solution 16 described above. Examples of the carboxylic acid ion include a formic acid ion, an acetic acid ion, a propionic acid ion, a tartaric acid ion, and a citric acid ion.

It should be understood that the negative electrode electrolytic solution 15 and the positive electrode electrolytic solution 16 may each include one or more of materials including, without limitation, tris(hydroxymethyl)aminomethane and ethylenediaminetetraacetic acid as a buffer or buffers.

More specifically, it is preferable that the negative electrode electrolytic solution 15 include a hydroxide ion as an anion, and the positive electrode electrolytic solution 16 include one or more of a sulfuric acid ion, a hydrogen sulfuric acid ion, a carbonic acid ion, a hydrogen carbonic acid ion, a phosphoric acid ion, a monohydrogen phosphoric acid ion, and a dihydrogen phosphoric acid ion as an anion or anions. A reason for this is that this makes it easier to control the pH of the negative electrode electrolytic solution 15 to be sufficiently high and to control the pH of the positive electrode electrolytic solution 16 to be sufficiently low.

Here, the negative electrode electrolytic solution 15 and the positive electrode electrolytic solution 16 are preferably isotonic solutions that are isotonic with each other. A reason for this is that this optimizes osmotic pressure of each of the negative electrode electrolytic solution 15 and the positive electrode electrolytic solution 16, and therefore makes it easier to maintain the high-and-low relationship between the pHs of the two electrolytic solutions.

In particular, as described above, the negative electrode electrolytic solution 15 includes a cation which is a metal ion. Such a metal ion is hereinafter referred to as a "metal cation". The metal cation includes an alkali metal ion. In addition, the positive electrode electrolytic solution 16 includes a metal cation, and the metal cation includes an alkali metal ion, as described above. The negative electrode electrolytic solution 15 may include only one kind of metal cation, or may include two or more kinds of metal cations, as described above. The positive electrode electrolytic solution 16 may include only one kind of metal cation, or may include two or more kinds of metal cations, as described above. A cation which is a non-metal ion such as a hydrogen ion is excluded from the above-described metal cation.

In this case, a difference between a total cation concentration (mol/kg) of the metal cation including the alkali metal ion in the negative electrode electrolytic solution 15 and a total cation concentration (mol/kg) of the metal cation including the alkali metal ion in the positive electrode electrolytic solution 16 is preferably 4 mol/kg or less, and more preferably 2 mol/kg or less. The above-described difference is a cation concentration difference (a difference in concentration of the metal cation including the alkali metal ion) expressed by the following expression: total cation concentration of positive electrode electrolytic solution 16−total cation concentration of negative electrode electrolytic solution 15. A reason why the cation concentration difference preferably falls within the above-described ranges is that the cation concentration difference related to the negative electrode electrolytic solution 15 and the positive electrode electrolytic solution 16 is optimized, which makes it easier to maintain the high-and-low relationship between the pHs of the two electrolytic solutions. Although the reason is unclear, it can be considered that each of the metal cation in the negative electrode electrolytic solution 15 and the metal cation in the positive electrode electrolytic solution 16 becomes more easily movable via the partition 12, and therefore the charging and discharging reactions proceed stably.

In a case where only one kind of metal cation is used, the "total cation concentration" described here is the concentration of that metal cation. In a case where two or more kinds of metal cations are used, the "total cation concentration" described here is the sum total of the concentrations of the respective kinds of metal cations.

That is, in a case where the negative electrode electrolytic solution 15 includes only the alkali metal ion to be inserted into and extracted from each of the negative electrode 13 and the positive electrode 14 as the metal cation, the total cation concentration is the concentration of the metal cation including only that alkali metal ion. In a case where the negative electrode electrolytic solution 15 includes another metal ion together with the alkali metal ion to be inserted into and extracted from each of the negative electrode 13 and the positive electrode 14 as the metal cations, the total cation concentration is the concentration of the metal cations including the alkali metal ion and the other metal ion. The other metal ion may be a metal ion to be inserted into and extracted from each of the negative electrode 13 and the positive electrode 14, a metal ion not to be inserted into and extracted from each of the negative electrode 13 and the positive electrode 14, or both, as described above.

The definition of the total cation concentration of the negative electrode electrolytic solution 15 described above is similarly applicable as the definition of the total cation concentration of the positive electrode electrolytic solution 16.

In a case of checking the total cation concentration of the negative electrode electrolytic solution 15, for example, the secondary battery is disassembled to collect the negative electrode electrolytic solution 15, following which the collected negative electrode electrolytic solution 15 is analyzed by a composition analysis method such as ICP emission spectrometry. The procedure for checking the total cation concentration of the positive electrode electrolytic solution 16 is similar to the procedure for checking the total cation concentration of the negative electrode electrolytic solution 15, except that the positive electrode electrolytic solution 16 is used instead of the negative electrode electrolytic solution 15.

In addition, the pH of the negative electrode electrolytic solution 15 is preferably so set as to prevent each of the negative electrode current collector 13A and the negative electrode active material layer 13B from being corroded easily. Similarly, the pH of the positive electrode electrolytic solution 16 is preferably so set as to prevent each of the positive electrode current collector 14A and the positive electrode active material layer 14B from being corroded easily. A reason for this is that this makes it easier for the charging and discharging reactions using the negative electrode 13 and the positive electrode 14 to proceed stably and continuously.

For example, upon charging the secondary battery, when the alkali metal ion is extracted from the positive electrode 14, the extracted alkali metal ion moves to the negative electrode 13 via the positive electrode electrolytic solution 16, the partition 12, and the negative electrode electrolytic solution 15. Thus, the alkali metal ion is inserted into the negative electrode 13.

For example, upon discharging the secondary battery, when the alkali metal ion is extracted from the negative electrode 13, the extracted alkali metal ion moves to the positive electrode 14 via the negative electrode electrolytic solution 15, the partition 12, and the positive electrode electrolytic solution 16. Thus, the alkali metal ion is inserted into the positive electrode 14.

In a case of manufacturing the secondary battery, for example, the negative electrode 13 and the positive electrode 14 are fabricated and the negative electrode electrolytic solution 15 and the positive electrode electrolytic solution 16 are prepared, following which the secondary battery is assembled, as described below.

First, the negative electrode active material, the negative electrode binder, and the negative electrode conductor are mixed together to obtain a negative electrode mixture. Thereafter, the negative electrode mixture is put into a solvent such as an organic solvent to thereby prepare a paste negative electrode mixture slurry. Lastly, the negative electrode mixture slurry is applied on both sides of the negative electrode current collector 13A excluding the coupling terminal 13AT to thereby form the negative electrode active material layers 13B. Thereafter, the negative electrode active material layers 13B may be compression-molded by means of a machine such as a roll pressing machine. In this case, the negative electrode active material layers 13B may be heated. The negative electrode active material layers 13B may be compression-molded a plurality of times.

The positive electrode active material layers 14B are formed on both sides of the positive electrode current collector 14A by a procedure similar to the fabrication procedure of the negative electrode 13 described above. Specifically, the positive electrode active material, the positive electrode binder, and the positive electrode conductor are mixed together to obtain a positive electrode mixture, following which the positive electrode mixture is put into a solvent such as an organic solvent to thereby prepare a paste positive electrode mixture slurry. Thereafter, the positive electrode mixture slurry is applied on both sides of the positive electrode current collector 14A excluding the coupling terminal 14AT to thereby form the positive electrode active material layers 14B. Thereafter, the positive electrode active material layers 14B may be compression-molded.

The ionic material is added to the aqueous solvent to thereby prepare each of the negative electrode electrolytic solution 15 and the positive electrode electrolytic solution 16. In this case, conditions including, without limitation, the kind and the concentration (mol/kg) of the ionic material are adjusted to thereby allow the pH of the positive electrode electrolytic solution 16 to be lower than the pH of the negative electrode electrolytic solution 15.

First, the outer package member 11 provided with the partition 12 is prepared. The outer package member 11 has, for example, an unillustrated negative electrode opening that is in communication with the negative electrode compartment S1 and an unillustrated positive electrode opening that is in communication with the positive electrode compartment S2. Thereafter, the negative electrode 13 is disposed in the negative electrode compartment S1 through the negative electrode opening, and the positive electrode 14 is disposed in the positive electrode compartment S2 through the positive electrode opening. In this case, a portion of the negative electrode current collector 13A, i.e., the coupling terminal 13AT, is led from the inside to the outside of the outer package member 11, and a portion of the positive electrode current collector 14A, i.e., the coupling terminal 14AT, is led from the inside to the outside of the outer package member 11. Lastly, the negative electrode electrolytic solution 15 is supplied into the negative electrode compartment S1 through the negative electrode opening, and the positive electrode electrolytic solution 16 is supplied into the positive electrode compartment S2 through the positive electrode opening. Thereafter, each of the negative electrode opening and the positive electrode opening can be sealed by a method such as a welding method. Thus, the negative electrode electrolytic solution 15 is contained in the negative electrode compartment S1 in which the negative electrode 13 is disposed, and the positive electrode electrolytic solution 16 is contained in the positive electrode compartment S2 in which the positive electrode 14 is disposed. As a result, the secondary battery is completed.

According to this secondary battery, the negative electrode 13 which the metal ion is insertable into and extractable from is disposed in the negative electrode compartment S1, and the negative electrode electrolytic solution 15 is contained in the negative electrode compartment S1. The positive electrode 14 which the metal ion is insertable into and extractable from is disposed in the positive electrode compartment S2, and the positive electrode electrolytic solution 16 is contained in the positive electrode compartment S2. The negative electrode electrolytic solution 15 and the positive electrode electrolytic solution 16 each include the metal ion to be inserted into and extracted from each of the negative electrode 13 and the positive electrode 14. The positive electrode electrolytic solution 16 has a pH lower than the pH of the negative electrode electrolytic solution 15.

In this case, as described above, the potential window of the aqueous solvent is widened while a decomposition reaction of the aqueous solvent is suppressed thermodynamically upon charging and discharging. Accordingly, the charging and discharging reactions utilizing insertion and extraction of the metal ion proceed sufficiently and stably while a high voltage is obtained. Therefore, a high voltage is obtainable, and a high discharge capacity and high charge and discharge efficiency are also obtainable. As a result, it is possible to achieve a superior battery characteristic.

In particular, in a case where one or both of the negative electrode electrolytic solution 15 and the positive electrode electrolytic solution 16 include the alkali metal ion, for example, the lithium ion, which is to be inserted into and extracted from each of the negative electrode 13 and the positive electrode 14, the one or both of the negative electrode electrolytic solution 15 and the positive electrode electrolytic solution 16 may further include another metal ion. This makes it easier to control each of the pH of the positive electrode electrolytic solution 16 and the pH of the negative electrode electrolytic solution 15, and also makes it easier to maintain the high-and-low relationship between the pHs of the two electrolytic solutions. Accordingly, it is possible to achieve higher effects.

In this case, the one or both of the negative electrode electrolytic solution 15 and the positive electrode electrolytic solution 16 may include one or both of a sodium ion and a potassium ion as the other metal ion. This makes it further easier to control each of the pH of the positive electrode electrolytic solution 16 and the pH of the negative electrode electrolytic solution 15, and also makes it further easier to maintain the high-and-low relationship between the pHs of the two electrolytic solutions. Accordingly, it is possible to achieve further higher effects.

Further, the negative electrode 13 may include a material such as the titanium-containing compound. This makes it easier for the charging and discharging reactions to proceed smoothly and stably even in a case of using the aqueous electrolytic solution, i.e., the negative electrode electrolytic solution 15 and the positive electrode electrolytic solution 16. Accordingly, it is possible to achieve higher effects.

Further, the pH of the negative electrode electrolytic solution 15 may be 11 or higher. This makes it easier to allow the pH of the positive electrode electrolytic solution 16 to be lower than the pH of the negative electrode electrolytic solution 15. Therefore, the charging and discharging reactions proceed more stably. Accordingly, it is possible to achieve higher effects.

Further, the pH of the positive electrode electrolytic solution 16 may be from 4 to 8 both inclusive. This makes it easier to allow the pH of the positive electrode electrolytic solution 16 to be lower than the pH of the negative electrode electrolytic solution 15. Accordingly, it is possible to achieve higher effects.

Further, the positive electrode electrolytic solution 16 may include an ion such as a sulfuric acid ion as an anion. This makes it easier to stably control the pH of the positive electrode electrolytic solution 16, and also makes it easier to maintain the high-and-low relationship between the pHs of the two electrolytic solutions. Accordingly, it is possible to achieve higher effects.

Further, the negative electrode electrolytic solution 15 may include a hydroxide ion as an anion, and the positive electrode electrolytic solution 16 may include an ion such as a sulfuric acid ion as an anion. This makes it easier to control the pH of the negative electrode electrolytic solution 15 to be sufficiently high, and also makes it easier to stably control the pH of the positive electrode electrolytic solution 16. Accordingly, it is possible to achieve higher effects.

Further, the cation concentration difference between the total cation concentration of the negative electrode electrolytic solution 15 and the total cation concentration of the positive electrode electrolytic solution 16 may be 2 mol/kg or less. This makes it easier to maintain the high-and-low relationship between the pHs of the two electrolytic solutions. Accordingly, it is possible to achieve higher effects.

Further, one or both of the negative electrode electrolytic solution 15 and the positive electrode electrolytic solution 16 are a saturated solution of the alkali metal salt including the alkali metal ion to be inserted into or extracted from each of the negative electrode 13 and the positive electrode 14 as a cation. This makes it further easier for the charging and discharging reactions to proceed while allowing a higher voltage to be obtained. Accordingly, it is possible to achieve higher effects.

Further, the partition 12 may include one or both of an ion exchange membrane and a solid electrolyte membrane. This improves a property of passing the metal ion, i.e., the cation. Accordingly, it is possible to achieve higher effects.

The above-described configuration of the secondary battery is appropriately modifiable, as will be described below. It should be understood that any two or more of the following series of modifications may be combined.

As examples of the negative electrode active material or the negative electrode material, the titanium-containing compound, the niobium-containing compound, the vanadium-containing compound, the iron-containing compound, and the molybdenum-containing compound are referred to above. However, the negative electrode active material may be a compound other than the titanium-containing compound and the like described above, as long as the compound makes it easier for the charging and discharging reactions to proceed smoothly and stably even in a case of using the aqueous electrolytic solution, i.e., the negative electrode electrolytic solution 15 and the positive electrode electrolytic solution 16.

Figure 2:
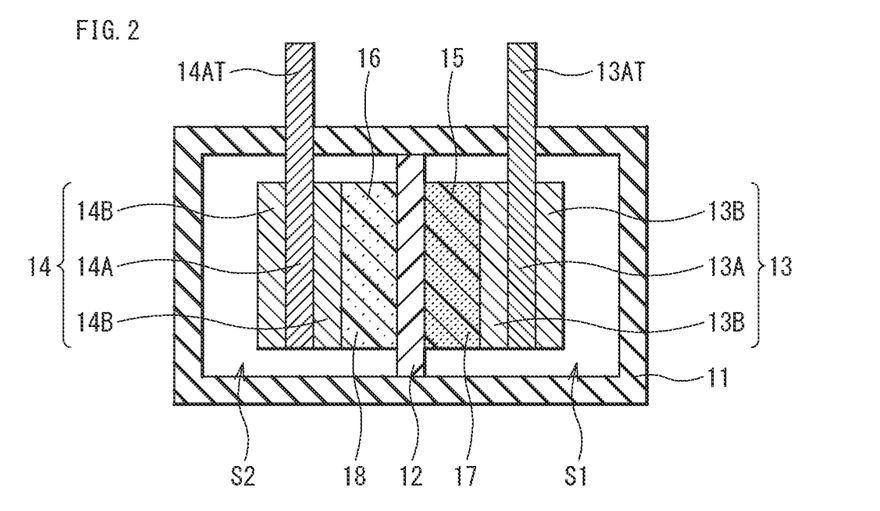
FIG. 2 is a sectional view of a configuration of a secondary battery according to an embodiment of the present technology.

In FIG. 1, the electrolytic solutions which are liquid electrolytes, i.e., the negative electrode electrolytic solution 15 and the positive electrode electrolytic solution 16, are used. However, for example, as illustrated in FIG. 2 corresponding to FIG. 1, electrolyte layers 17 and 18 may be used instead of the electrolytic solutions. The electrolyte layers 17 and 18 are gel electrolytes.

In a case of using the electrolyte layers 17 and 18, for example, as illustrated in FIG. 2, the electrolyte layer 17 is interposed between the partition 12 and the negative electrode 13, and the electrolyte layer 18 is interposed between the partition 12 and the positive electrode 14. That is, the electrolyte layer 17 is adjacent to each of the partition 12 and the negative electrode 13, and the electrolyte layer 18 is adjacent to each of the partition 12 and the positive electrode 14.

Specifically, the electrolyte layer 17 includes the negative electrode electrolytic solution 15 and a polymer compound. In the electrolyte layer 17, the negative electrode electrolytic solution 15 is held by the polymer compound. The electrolyte layer 18 includes the positive electrode electrolytic solution 16 and a polymer compound. In the electrolyte layer 18, the positive electrode electrolytic solution 16 is held by the polymer compound. The polymer compound may be one or more of materials including, without limitation, polyvinylidene difluoride and polyethylene oxide. It should be understood that, in FIG. 2, the electrolyte layer 17 including the negative electrode electrolytic solution 15 is darkly shaded and the electrolyte layer 18 including the positive electrode electrolytic solution 16 is lightly shaded.

In a case of forming the electrolyte layer 17, for example, a precursor solution including, without limitation, the negative electrode electrolytic solution 15, the polymer compound, and an organic solvent is prepared and thereafter, the precursor solution is applied on the negative electrode 13. In a case of forming the electrolyte layer 18, for example, a precursor solution including, without limitation, the positive electrode electrolytic solution 16, the polymer compound, and an organic solvent is prepared and thereafter, the precursor solution is applied on the positive electrode 14.

In this case also, a metal ion such as the alkali metal ion is movable between the negative electrode 13 and the positive electrode 14 via the electrolyte layers 17 and 18. Accordingly, it is possible to achieve similar effects.

Applications of the secondary battery are not particularly limited as long as they are, for example, machines, apparatuses, instruments, devices, or systems (assemblies of a plurality of apparatuses, for example) in which the secondary battery is usable as a driving power source, an electric power storage source for electric power accumulation, or any other source. The secondary battery used as a power source may serve as a main power source or an auxiliary power source. The main power source is preferentially used regardless of the presence of any other power source. The auxiliary power source may be used in place of the main power source, or may be switched from the main power source on an as-needed basis. In a case where the secondary battery is used as the auxiliary power source, the kind of the main power source is not limited to the secondary battery.

Specific examples of the application of the secondary battery include: electronic apparatuses including portable electronic apparatuses; portable life appliances; storage devices; electric power tools; battery packs mountable on laptop personal computers or other apparatuses as detachable power sources; medical electronic apparatuses; electric vehicles; and electric power storage systems. Examples of the electronic apparatuses include video cameras, digital still cameras, mobile phones, laptop personal computers, cordless phones, headphone stereos, portable radios, portable televisions, and portable information terminals. Examples of the portable life appliances include electric shavers. Examples of the storage devices include backup power sources and memory cards. Examples of the electric power tools include electric drills and electric saws. Examples of the medical electronic apparatuses include pacemakers and hearing aids. Examples of the electric vehicles include electric automobiles including hybrid automobiles. Examples of the electric power storage systems include home battery systems for accumulation of electric power for emergency. Needless to say, the secondary battery may have applications other than the series of applications described above.

EXAMPLES

Examples of the technology are described below.

Experiment Examples 1 to 20

As described below, secondary batteries using the alkali metal ion as the metal ion to be inserted and extracted were fabricated, and thereafter the fabricated secondary batteries were evaluated for a battery characteristic. Here, secondary batteries each using a glass container (a glass case) as the outer package member 11 were fabricated.

In a case of fabricating the negative electrode 13, first, 89 parts by mass of the negative electrode active material, 10 parts by mass of the negative electrode binder (polyvinylidene difluoride), and 1 part by mass of the negative electrode conductor (graphite) were mixed together to obtain a negative electrode mixture. As the negative electrode active material, $TiO_2$ and $Li_4Ti_5O_{12}$ (LTO) which are the titanium-containing compounds and $NaTi_2(PO_4)_3$ (NTP) which is the titanium phosphoric acid compound were used. Thereafter, the negative electrode mixture was put into an organic solvent (N-methyl-2-pyrrolidone), following which the organic solvent was stirred to prepare a paste negative electrode mixture slurry. Thereafter, the negative electrode mixture slurry was applied on both sides of the negative electrode current collector 13A, having a thickness of 10 μm, excluding the coupling terminal 13AT by means of a coating apparatus. Thereafter, the applied negative electrode mixture slurry was dried to thereby form the negative electrode active material layers 13B. Here, stainless steel (SUS444), tin (Sn), and titanium (Ti) were used as the materials for forming the negative electrode current collector 13A.

In a case of fabricating the positive electrode 14, first, 91 parts by mass of the positive electrode active material, 3 parts by mass of the positive electrode binder (polyvinylidene difluoride), and 6 parts by mass of the positive electrode conductor (graphite) were mixed together to obtain a positive electrode mixture. As the positive electrode active material, $LiFePO_4$ (LFP) which is a lithium phosphoric acid compound, $LiCoO_2$ (LCO), $LiMn_2O_4$ (LMO), and $LiNi_{0.8}Co_{0.15}Al_{0.05}O_2$ (NCA) which are lithium composite oxides, and $Na_2MnFe(CN)_6$ (NMHCF) which is a sodium-containing compound were used. Thereafter, the positive electrode mixture was put into an organic solvent (N-methyl-2-pyrrolidone), following which the organic solvent was stirred to obtain a paste positive electrode mixture slurry. Thereafter, the positive electrode mixture slurry was applied on both sides of the positive electrode current collector 14A, having a thickness of 10 μm, excluding the coupling terminal 14AT by means of a coating apparatus. Thereafter, the applied positive electrode mixture slurry was dried to thereby form the positive electrode active material layers 14B. Here, aluminum (Al) and titanium (Ti) were used as the materials for forming the positive electrode current collector 14A.

In a case of preparing each of the negative electrode electrolytic solution 15 and the positive electrode electrolytic solution 16, the ionic material was put into an aqueous solvent (pure water), following which the aqueous solvent was stirred. The kinds of the ionic material, and the concentrations (mol/kg) and the pHs of each of the negative electrode electrolytic solution 15 and the positive electrode electrolytic solution 16 were as listed in Table 1 and Table 2. Here, as the ionic material, lithium hydroxide (LiOH), potassium hydroxide (KOH), lithium citrate ($Li_3Cit$), lithium nitrate ($LiNO_3$), sodium hydroxide (NaOH), lithium bis(trifluoromethane sulfonyl)imide (LiTFSI), lithium chloride (LiCl), potassium nitrate ($KNO_3$), lithium sulfate ($Li_2SO_4$), dilithium hydrogen phosphate ($Li_2HPO_4$), dipotassium hydrogen phosphate ($K_2HPO_4$), and lithium dihydrogen phosphate ($LiH_2PO_4$) which are electrolyte salts (lithium salts, sodium salts, and potassium salts which are the alkali metal salts) were used.

As each of the negative electrode electrolytic solution 15 and the positive electrode electrolytic solution 16, a saturated solution of the electrolyte salt obtained by adjusting its concentration on an as-needed basis was used. The description with parentheses "(sat)" in the column of the concentration in each of Table 1 and Table 2 represents that the negative electrode electrolytic solution 15 or the positive electrode electrolytic solution 16 was a saturated solution of the electrolyte salt.

Further, as each of the negative electrode electrolytic solution 15 and the positive electrode electrolytic solution 16, a pH buffer solution including any of a citric acid ion, a sulfuric acid ion, and a phosphoric acid ion as an anion was used on an as-needed basis.

It should be understood that, in a case of preparing each of the negative electrode electrolytic solution 15 and the positive electrode electrolytic solution 16, two kinds of alkali metal salts (a lithium salt and a potassium salt) were used on an as-needed basis to thereby adjust each of the pH of the negative electrode electrolytic solution 15 and the pH of the positive electrode electrolytic solution 16.

In a case of assembling the secondary battery, first, a glass container having the partition 12 attached thereto was prepared as the outer package member 11. The negative electrode compartment S1 and the positive electrode compartment S2 were separated from each other in advance with the partition 12 interposed therebetween in the glass container.

As the partition 12, an ion exchange membrane (a cation exchange membrane Nafion 115 (registered trademark) purchased from Sigma-Aldrich Japan G.K.) and a solid electrolyte membrane (a solid electrolyte LICGC (registered trademark) AG-01 manufactured by OHARA INC.) were used. The solid electrolyte membrane includes a $Li_2O$—$Al_2O_3$—$SiO_2$—$P_2O_5$—$TiO_2$—$GeO_2$-based solid electrolyte. In the column of "partition" in each of Table 1 and Table 2, a case where the ion exchange membrane was used is deIt should be understood by "exchange membrane", and a case where the solid electrolyte membrane was used is deIt should be understood by "electrolyte".

Therefore, the negative electrode 13 was disposed in the negative electrode compartment S1, following which the negative electrode electrolytic solution 15 was supplied into the negative electrode compartment S1. In this case, a portion of the negative electrode 13, i.e., the coupling terminal 13AT, was led out to the outside of the outer package member 11. Lastly, the positive electrode 14 was disposed in the positive electrode compartment S2, following which the positive electrode electrolytic solution 16 was supplied into the positive electrode compartment S2. In this case, a portion of the positive electrode 14, i.e., the coupling terminal 14AT, was led out to the outside of the outer package member 11. Thus, the negative electrode electrolytic solution 15 was contained in the negative electrode compartment S1 and the positive electrode electrolytic solution 16 was contained in the positive electrode compartment S2. As a result, a test secondary battery was completed.

The concentrations (mol/kg) and the pHs of each of the negative electrode electrolytic solution 15 and the positive electrode electrolytic solution 16 were as listed in Table 1 and Table 2. In this case, examination of each of the total cation concentration (mol/kg) of the negative electrode electrolytic solution 15 and the total cation concentration (mol/kg) of the positive electrode electrolytic solution 16 revealed the results presented in Table 3.

The secondary batteries were evaluated for charge and discharge characteristics (i.e., chargeability and dischargeability, tenth-cycle charge and discharge efficiency, and charge and discharge efficiency of a post-storage charge and discharge cycle), as a battery characteristic. The evaluation results are presented in Tables 1 to 3.

In a case of charging the secondary battery, the secondary battery was charged with a constant current of 2 C until a voltage reached a charge end voltage (V) listed in each of Tables 1 and 2 in an ambient temperature environment having a temperature of 25° C. In this case, the charge end voltage was set in accordance with the kind of the negative electrode active material and the kind of the positive electrode active material. It should be understood that 2 C is a value of a current that causes a battery capacity (a theoretical capacity) to be completely discharged in 0.5 hours.

In a case of discharging the secondary battery, the secondary battery was discharged with a constant current of 2 C until the voltage reached a discharge end voltage (V) listed in each of Tables 1 and 2. In this case, the discharge end voltage was set in accordance with the kind of the negative electrode active material and the kind of the positive electrode active material in a manner similar to that in the case where the charge end voltage was set.

In a case of evaluating the chargeability and dischargeability, charging and discharging operations were performed on the secondary battery under the above-described charging and discharging conditions to check whether the secondary battery was able to be charged and discharged.

In a case where a result of the foregoing evaluation of the chargeability and dischargeability was that the secondary battery was able to be charged and discharged, further, the tenth-cycle charge and discharge efficiency was calculated. In this case, the secondary battery was charged and discharged for ten cycles under the above-described charging and discharging conditions to thereby measure the tenth-cycle charge capacity and measure the tenth-cycle discharge capacity. Thereafter, charge and discharge efficiency (%) was calculated as follows: charge and discharge efficiency (%)=(tenth-cycle discharge capacity/tenth-cycle charge capacity)×100.

Further, in the case where the secondary battery was able to be charged and discharged, the secondary battery was stored in the ambient temperature environment for a storage period of four days, following which post-storage efficiency (%) was calculated by a procedure similar to the above-described procedure for calculating the charge and discharge efficiency. The post-storage efficiency is the charge and discharge efficiency after the secondary battery was stored.

TABLE 1

| Experiment example | Negative electrode | | Positive electrode | | Negative electrode electrolytic solution | | | Positive electrode electrolytic solution |
|---|---|---|---|---|---|---|---|---|
| | Negative electrode active material | Negative electrode current collector | Positive electrode active material | Positive electrode current collector | Ionic material | Concentration (mol/kg) | pH | Ionic material |
| 1 | TiO$_2$ | SUS444 | LFP | Al | LiOH | 4(sat) | 12 | LiNO$_3$ |
| 2 | TiO$_2$ | SUS444 | LCO | Al | LiOH | 4(sat) | 12 | LiNO$_3$ |
| 3 | LTO | Sn | LCO | Al | LiOH | 1 | 11 | LiNO$_3$ |
| 4 | LTO | Sn | LFP | Al | LiOH | 4(sat) | 12 | Li$_2$SO$_4$ |
| 5 | LTO | Sn | LCO | Al | LiOH | 4(sat) | 12 | LiNO$_3$ |
| 6 | LTO | Sn | LCO | Al | LiOH + KOH | 4(sat) + 8 | 14 | LiNO$_3$ + KNO$_3$ |
| 7 | TiO$_2$ | SUS444 | LFP | Al | Li$_3$Cit | 3 (sat) | 8 | LiNO$_3$ |
| 8 | TiO$_2$ | SUS444 | LFP | Al | LiNO$_3$ | 1 | 5 | LiNO$_3$ |
| 9 | LTO | SUS444 | LFP | Al | LiNO$_3$ | 1 | 5 | LiNO$_3$ |
| 10 | LTO | SUS444 | LCO | Al | LiOH | 4(sat) | 12 | LiOH |

| Experiment example | Positive electrode electrolytic solution | | Partition | Charge end voltage (V) | Discharge end voltage (V) | Chargeability and dischargeability | Charge and discharge efficiency (%) |
|---|---|---|---|---|---|---|---|
| | Concentration (mol/kg) | pH | | | | | |
| 1 | 10 | 4 | Exchange membrane | 1.7 | 1.2 | Affirmative | 85 |
| 2 | 13(sat) | 4 | Exchange membrane | 2.3 | 1.8 | Affirmative | 83 |
| 3 | 1 | 4 | Exchange membrane | 2.6 | 2.1 | Affirmative | 49 |

TABLE 1-continued

| | | | | | | | |
|---|---|---|---|---|---|---|---|
| 4 | 3(sat) | 5 | Exchange membrane | 2.0 | 1.5 | Affirmative | 55 |
| 5 | 13(sat) | 4 | Exchange membrane | 2.6 | 2.1 | Affirmative | 54 |
| 6 | 13(sat) + 3 | 4 | Exchange membrane | 2.6 | 2.1 | Affirmative | 65 |
| 7 | 13(sat) | 4 | Exchange membrane | 1.7 | 1.2 | Affirmative | 78 |
| 8 | 1 | 5 | Exchange membrane | 1.7 | 1.2 | Negative | — |
| 9 | 1 | 5 | Exchange membrane | 2.0 | 1.5 | Negative | — |
| 10 | 4(sat) | 12 | Exchange membrane | 2.6 | 2.1 | Negative | — |

TABLE 2

| Experiment example | Negative electrode | | Positive electrode | | Negative electrode electrolytic solution | | | Positive electrode electrolytic solution |
|---|---|---|---|---|---|---|---|---|
| | Negative electrode active material | Negative electrode current collector | Positive electrode active material | Positive electrode current collector | Ionic material | Concentration (mol/kg) | pH | Ionic material |
| 11 | $TiO_2$ | SUS444 | LMO | Al | LiOH | 4(sat) | 12 | $Li_2SO_4$ |
| 12 | $TiO_2$ | SUS444 | NCA | Al | LiOH | 4(sat) | 12 | $Li_2SO_4$ |
| 13 | $TiO_2$ | SUS444 | LFP | Al | LiOH | 4(sat) | 12 | $Li_2SO_4$ |
| 14 | $TiO_2$ | SUS444 | LFP | Al | LiOH + KOH | 4(sat) + 1 | 13 | $Li_2SO_4$ |
| 15 | $TiO_2$ | SUS444 | LFP | Ti | LiOH + KOH | 4(sat) + 8 | 14 | $Li_2HPO_4 + K_2HPO_4$ |
| 16 | $TiO_2$ | SUS444 | LFP | Al | LiOH | 4(sat) | 12 | $Li_2SO_4$ |
| 17 | $TiO_2$ | SUS444 | LFP | Ti | LiOH | 4(sat) | 12 | $LiH_2PO_4 + Li_2HPO_4$ |
| 18 | NTP | Ti | NMHCF | Ti | NaOH | 2 | 14 | NaCl |
| 19 | LTO | SUS444 | LCO | Al | LiTFSI | 1 | 6 | LiTFSI |
| 20 | LTO | SUS444 | LCO | Al | LiCl | 9 | 7 | LiCl |

| Experiment example | Positive electrode electrolytic solution | | Partition | Charge end voltage (V) | Discharge end voltage (V) | Chargeability and dischargeability | Charge and discharge efficiency (%) |
|---|---|---|---|---|---|---|---|
| | Concentration (mol/kg) | pH | | | | | |
| 11 | 3(sat) | 5 | Exchange membrane | 2.3 | 1.8 | Affirmative | 85 |
| 12 | 3(sat) | 5 | Exchange membrane | 2.3 | 1.8 | Affirmative | 85 |
| 13 | 3(sat) | 5 | Exchange membrane | 1.7 | 1.2 | Affirmative | 86 |
| 14 | 3(sat) | 5 | Exchange membrane | 1.7 | 1.2 | Affirmative | 88 |
| 15 | 0.3(sat) + 5 | 8 | Exchange membrane | 1.7 | 1.2 | Affirmative | 90 |
| 16 | 3(sat) | 5 | Electrolyte | 1.7 | 1.2 | Affirmative | 70 |
| 17 | 3 + 0.3(sat) | 3 | Exchange membrane | 1.7 | 1.2 | Affirmative | 87 |
| 18 | 3 | 7 | Exchange membrane | 1.6 | 0.9 | Affirmative | 81 |
| 19 | 1 | 6 | Exchange membrane | 2.6 | 2.1 | Negative | — |
| 20 | 5 | 7 | Exchange membrane | 2.6 | 2.1 | Negative | — |

TABLE 3

| Experiment example | Negative electrode | | Positive electrode | | Negative electrode electrolytic solution | | | Positive electrode electrolytic solution | | | Total cation concentration (mol/kg) | | Cation concentration difference | Post-storage efficiency (%) |
|---|---|---|---|---|---|---|---|---|---|---|---|---|---|---|
| | Negative electrode active material | Negative electrode current collector | Positive electrode active material | Positive electrode current collector | Ionic material | Concentration (mol/kg) | pH | Ionic material | Concentration (mol/kg) | pH | Negative electrode electrolytic solution | Positive electrode electrolytic solution | | |
| 1 | TiO$_2$ | SUS444 | LFP | Al | LiOH | 4(sat) | 12 | LiNO$_3$ | 10 | 4 | 4 | 10 | 6 | 65 |
| 13 | TiO$_2$ | SUS444 | LFP | Al | LiOH | 4(sat) | 12 | Li$_2$SO$_4$ | 3(sat) | 5 | 4 | 6 | 2 | 86 |
| 14 | TiO$_2$ | SUS444 | LFP | Al | LiOH + KOH | 4(sat) + 1 | 13 | Li$_2$SO$_4$ | 3(sat) | 5 | 5 | 6 | 1 | 88 |

As described in Tables 1 to 3, the charge and discharge characteristics of the secondary battery varied depending on the relationship between the pH of the negative electrode electrolytic solution 15 and the pH of the positive electrode electrolytic solution 16.

Specifically, in a case where the pH of the positive electrode electrolytic solution 16 was the same as the pH of the negative electrode electrolytic solution 15 (Experiment examples 8 to 10, 19, and 20), the secondary battery was able to be charged but was unable to be discharged. Therefore, it was not possible to charge and discharge the secondary battery. Accordingly, it was not possible to calculate the charge and discharge efficiency.

In contrast, in a case where the pH of the positive electrode electrolytic solution 16 was lower than the pH of the negative electrode electrolytic solution 15 (Experiment examples 1 to 7 and 11 to 18), the secondary battery was able to be charged and was also able to be discharged. Therefore, it was possible to charge and discharge the secondary battery. Accordingly, it was also possible to calculate the charge and discharge efficiency.

In particular, a series of tendencies described below were obtained in the case where the pH of the positive electrode electrolytic solution 16 was lower than the pH of the negative electrode electrolytic solution 15.

Firstly, in a case where the other metal ion (the potassium ion) was used together with the alkali metal ion (the lithium ion) (Experiment example 6), the difference between the pH of the negative electrode electrolytic solution 15 and the pH of the positive electrode electrolytic solution 16 increased, and the charge and discharge efficiency therefore increased, as compared with a case where only the alkali metal salt (the lithium ion) was used (Experiment example 3).

Secondly, in a case where the saturated solution of the electrolyte salt was used as each of the negative electrode electrolytic solution 15 and the positive electrode electrolytic solution 16 (Experiment example 2), the charge and discharge efficiency increased, as compared with the case where the saturated solution of the electrolyte salt was not used (Experiment example 3).

Thirdly, in a case where the pH buffer solution was used as the positive electrode electrolytic solution 16 (Experiment example 17), the charge and discharge efficiency increased, as compared with a case where the pH buffer solution was not used (Experiment example 1).

Fourthly, in a case where: the other metal ion (the potassium ion) was used together with the alkali metal ion (the lithium ion); the saturated solution of the electrolyte salt was used as each of the negative electrode electrolytic solution 15 and the positive electrode electrolytic solution 16; and the pH buffer solution was further used as the positive electrode electrolytic solution 16 (Experiment example 15), the charge and discharge efficiency increased most.

Fifthly, in a case where the partition was the ion exchange membrane (Experiment example 13), the charge and discharge efficiency increased, as compared with a case where the partition was the solid electrolyte membrane (Experiment example 16).

Sixthly, in a case where the cation concentration difference was 4 mol/kg or less (Experiment examples 13 and 14), the post-storage efficiency increased, as compared with a case where the cation concentration difference was greater than 4 mol/kg (Experiment example 1). In this case, the storage efficiency was sufficiently high if the cation concentration difference was 2 mol/kg or less.

The results presented in Tables 1 to 3 indicate that, in the case where the pH of the negative electrode electrolytic solution 15 was lower than the pH of the positive electrode electrolytic solution 16 in the secondary battery of the metal ion insertion and extraction type, the charge and discharge characteristics improved. Accordingly, the secondary battery achieved a superior battery characteristic.

Although the configuration of the secondary battery of the technology has been described above with reference to some embodiments and Examples, the configuration of the secondary battery of the technology is not limited to those described with reference to the embodiments and Examples above, and is therefore modifiable in a variety of ways.

The effects described herein are mere examples. Therefore, the effects of the technology are not limited to the effects described herein. Accordingly, the technology may achieve any other effect.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
    a partition that separates a first space and a second space from each other and allows a metal ion to pass therethrough between the first space and the second space;
    a negative electrode that is disposed in the first space and that the metal ion is to be inserted into and extracted from;
    a positive electrode that is disposed in the second space and that the metal ion is to be inserted into and extracted from;

a first aqueous electrolytic solution that is contained in the first space and includes the metal ion to be inserted into and extracted from each of the negative electrode and the positive electrode; and a second aqueous electrolytic solution that is contained in the second space and includes the metal ion to be inserted into and extracted from each of the negative electrode and the positive electrode, wherein the second aqueous electrolytic solution has a pH lower than the first aqueous electrolytic solution, and both of the first aqueous electrolytic solution and the second aqueous electrolytic solution comprise a saturated solution of a metal salt including the metal ion to be inserted into and extracted from each of the negative electrode and the positive electrode as a cation.

2. The secondary battery according to claim 1, wherein the first aqueous electrolytic solution, the second aqueous electrolytic solution, or both include an alkali metal ion as the metal ion to be inserted into and extracted from each of the negative electrode and the positive electrode.

3. The secondary battery according to claim 2, wherein the first aqueous electrolytic solution, the second aqueous electrolytic solution, or both include a lithium ion as the alkali metal ion.

4. The secondary battery according to claim 1, wherein the first aqueous electrolytic solution, the second aqueous electrolytic solution, or both further include a second metal ion that is different from the metal ion to be inserted into and extracted from each of the negative electrode and the positive electrode.

5. The secondary battery according to claim 2, wherein the first aqueous electrolytic solution, the second aqueous electrolytic solution, or both further include another metal ion that is different from the metal ion to be inserted into and extracted from each of the negative electrode and the positive electrode.

6. The secondary battery according to claim 3, wherein the first aqueous electrolytic solution, the second aqueous electrolytic solution, or both further include another metal ion that is different from the metal ion to be inserted into and extracted from each of the negative electrode and the positive electrode.

7. The secondary battery according to claim 4, wherein the first aqueous electrolytic solution, the second aqueous electrolytic solution, or both include a sodium ion, a potassium ion, or both as the second metal ion.

8. The secondary battery according to claim 1, wherein the negative electrode includes at least one of a titanium-containing compound, a niobium-containing compound, a vanadium-containing compound, an iron-containing compound, or a molybdenum-containing compound.

9. The secondary battery according to claim 1, wherein the pH of the first aqueous electrolytic solution is higher than or equal to 11.

10. The secondary battery according to claim 1, wherein the first aqueous electrolytic solution includes a hydroxide ion as an anion.

11. The secondary battery according to claim 1, wherein a difference between a total cation concentration in moles per kilogram of a first metal cation including the metal ion in the first aqueous electrolytic solution and a total cation concentration in moles per kilogram of a second metal cation including the metal ion in the second aqueous electrolytic solution is less than or equal to 2 moles per kilogram, and wherein the difference is obtained by subtracting the total cation concentration of the first aqueous electrolytic solution from the total cation concentration of the second aqueous electrolytic solution.

12. The secondary battery according to claim 1, wherein the partition includes an ion exchange membrane, a solid electrolyte membrane, or both.

13. The secondary battery according to claim 1, wherein the pH buffer solution includes the monohydrogen phosphoric acid ion and the dihydrogen phosphoric acid ion.

14. The secondary battery according to claim 1, wherein the metal salt is deposited in an inside of the first space and an inside of the second space.

* * * * *